United States Patent [19]

Thiele

[11] 3,754,746
[45] Aug. 28, 1973

[54] MECHANICAL DAMPING STRUCTURE

[75] Inventor: Wolfgang Thiele, Bad Homburg, Germany

[73] Assignee: Metallgesellschaft Aktiengesellschaft, Frankfurt am Main, Germany

[22] Filed: Oct. 7, 1971

[21] Appl. No.: 187,400

[30] Foreign Application Priority Data
Oct. 10, 1970 Germany.................. P 20 49 918.7

[52] U.S. Cl. .............................................. 267/151
[51] Int. Cl.............................................. F16f 1/36
[58] Field of Search.................... 267/147, 148, 146, 267/149, 151

[56] References Cited
UNITED STATES PATENTS
3,416,782  12/1968  Warnaka............................ 267/147
2,829,881  4/1958  Morris ................................ 267/147

Primary Examiner—James B. Marbert
Attorney—Karl F. Ross

[57] ABSTRACT

A body adapted to absorb energy, especially a shock or force damper, consists of a sponge or foam metal matrix with pores and, preferably, a filler of vermiculite or perlite in an expanded state. The body is predeformed through 5 to 35 percent of its original volume before it is employed as a shock or force damper.

14 Claims, 5 Drawing Figures

Patented Aug. 28, 1973

3,754,746

Wolfgang Thiele
INVENTOR.

BY

Karl G. Ross
Attorney

MECHANICAL DAMPING STRUCTURE

FIELD OF THE INVENTION

My present invention relates to force, shock or energy-absorbing bodies and to a method of making same. More particularly, the invention relates to a force or shock absorber.

BACKGROUND OF THE INVENTION

The use of energy-absorbing bodies is common in many mechanical fields and such bodies have been employed as vibration dampers, shock dampers designed to prevent overloading of sensitive structures, energy absorbers adapted to take up kinetic energy of a particular part, and acoustical absorbers operating at sonic frequencies. While many damping systems make use of fluid dissipators of energy, others are intended to deform plastically and thus convert kinetic energy of impact, shock or force into energy of deformation.

For example, when a sensitive structure may be subjected to impact, a crushable, collapsible or plastically deformable body may be provided between it and the source of the impact or between a support and the sensitive element, or all around or partially around the sensitive element, to absorb the kinetic energy which might otherwise be transferred fully to this element. To this end, the shock-damping material should have a high specific energy absorption, a low specific gravity and, as much as possible, a plastic deformability under impact-type loading. For structural reasons, however, it must also have a minimum compressive strength.

It has already been found that certain spongy and foam-like metals have the desired characteristics and are useful as shock-damping and overload-protection members in systems in which other mechanical elements are sensitive to shock or impact. The shock-absorption capacity or capabilities of such structures is, however, a function of the pore volume, expressed in terms of the percentage of the total volume occupied by the pores. In terms of an elongated element such as a rod, for example, the pore volume of 50 percent means that the rod can be compressed to maximum half its length during the shock-damping process. With further compression under shock, the deformation resistance rises sharply and any further deformation becomes, in large measure, an undesirable elastic deformation. Thus deformation in this range is of no interest with respect to energy absorption. In fact, efforts have been made to increase the plastic range of deformation and it is thus desirable that the pore volume be as much as 75 percent, corresponding to a maximum inelastic deformation to about one quarter of the original length of the body.

Accompanying the plastic deformation of the body upon the transfer of shock or force thereto is a deceleration of the energy-containing part whose force or motion is to be damped. This part or body undergoes deceleration or negative acceleration as the plastically deformable body yields to the force and eventually is brought to a standstill. It is desirable for many purposes that the deceleration be as small as possible so that the velocity reduction of the body occurs at a substantially constant rate and to the desired degree without breakdown of the system. In other words, a high negative rate of change of the velocity deceleration of the energy-carrying body with respect to the surface against which the energy absorber is deformed is not desirable for many purposes. It should be noted that the structural limitations of energy-absorbing dampers, e.g., the desire to have as high an absorptive energy coefficient (i.e., ratio of energy absorbed or dissipated to volume or weight of the absorbing body) as possible, a minimum size of the energy-absorptive body (e.g., so that when the body operates as a bumper, shock absorber or the like in an automotive vehicle, the vehicle length is not unnecessarily increased), and as constant a velocity curve as possible over the major part of the energy-absorbing operation. As a result, it is desirable to have a shock absorber with a characteristic curve approximating a trapezoid when, for example, the speed reduction rate is brought against time. Thus, when I describe the retardation characteristics of a body hereinbelow, it should be understood that it is the retardation of the energy-absorbing body with respect to time which is involved.

OBJECTS OF THE INVENTION

It is the principal object of the present invention to provide an improved energy, force or shock-absorbing body, adapted to be used for abosrbing unexpected, unusual and undesirable mechanical-energy surges, to prevent damage to sensitive parts, and to block energy transfer to substantially any purpose.

Another object of the invention is to provide a shock-absorbing body of the type and for the purposes described which has an improved retardation characteristic.

Yet another object of the invention is to provide an improved method of making a shock-absorbing body in which the aforementioned disadvantages are obviated and the retardation characteristics thereof are improved over conventional energy absorbers.

Still another object of the invention is to provide a method of treating an energy-absorbing body, operating by plastic deformation to improve the retardation characteristics thereof.

SUMMARY OF THE INVENTION

These objects and others which will become apparent hereinafter, are attained in accordance with the present invention, with foam and sponge metal-absorbing bodies having a relatively high pore volume, e.g., up to 75 percent of the volume of the body, which is precompressed prior to use as an energy absorber through 5 to 35 percent, is linear measured by compression or elongation as with plastic deformation. Surprisingly, we have found that this step of plastically deforming the body, is capable of transforming a nonideal retardation characteristic thereof into a retardation characteristic more closely approximating the ideal or, in general, improving the characteristic of the body. The deformation may be produced by pressing, compressing, hammering, crushing, drawing, rolling or like compaction and elongation techniques of which any method used to work metals may be employed as long as it results in a plastic deformation in the direction of energy absorption through 5 to 35 percent of the linear dimension of the body in this direction. In other words, if the body is an elongated block adapted to absorb compressive forces, the body is precompressed by 5 to 35 percent of its linear dimension in this direction before it is interposed between the energy-carrying body and a supporting surface. Thus the degree of deformation in percent as defined above is the percentile change in length and is the ratio of the length after deformation to the corresponding length prior to deformation, expressed in percent. Preferably, the predeformation is 10 to 20 percent.

According to a feature of the invention, the body consists of a matrix of foam metal or sponge metal, the metal being aluminum, zinc, magnesium, nickel, copper or alloys of these metals interstitial with spaces which may be gas-filled, evacuated, or filled in whole or in part with expanded mineral substances such as expanded vermiculite, expanded perlite, expanded clay, foamed glass, hollow corundum spheres and like cellular, reticulate or single-hollow mineral and preferably vitreous particles.

According to the present invention, when gas-formed cells are provided within the metal matrix, the metal is cast in the form of a gas-releasing metal compound, especially the metal hydride, the release of hydrogen resulting in a cellular or reticulate metal structure. It has been found to be advantageous, especially when the internal cavities of the body are to contain an expanded-mineral or cellular nonmetallic filler to dispose the filler in a random or ordered pile within a mold whose cavity has the desired shape for the finished body and then to cast the metal into the interstices of the pile whereby the metal is permitted to harden. The particle size of the mineral, which is a refractory substance as noted above, then determines the size of the cavities.

DESCRIPTION OF THE DRAWING

The above and other objects, features and advantages of the present invention will become more readily apparent from the following description, reference being made to the accompanying drawing in which.

SPECIFIC DESCRIPTION

Figure 1A:
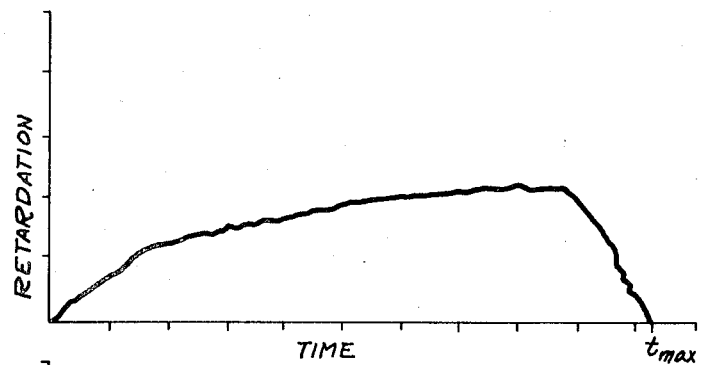
FIGS. 1a, 1b, 2a and 2b are retardation curves illustrating the invention.
Figure 1B:
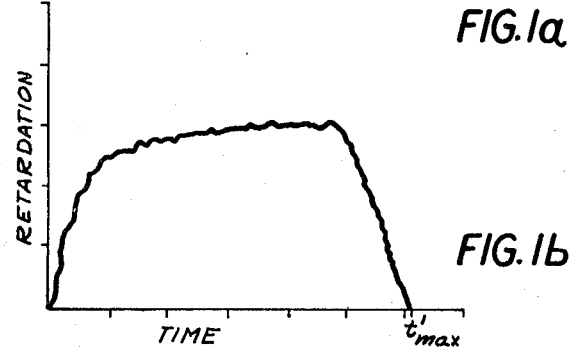
Figure 1:
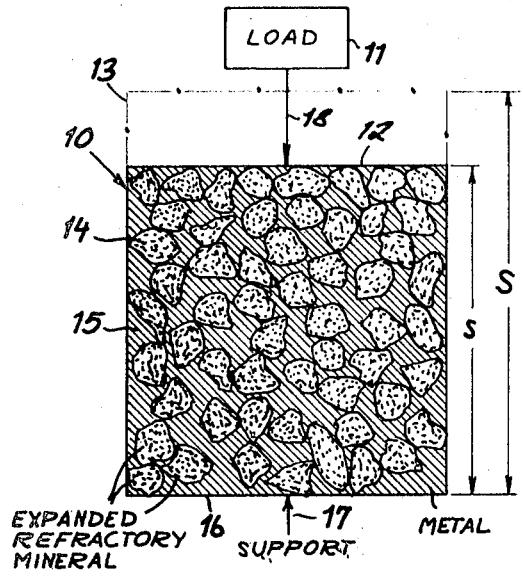
FIG. 1 is an elevational view of a shock- or energy-absorbing body according to the invention.

In FIG. 1, we show diagrammatically a mass 10 of a metal matrix (aluminum, zinc, magnesium, nickel, copper or an alloy thereof) 15 surrounding particles 14 of expanded refractory mineral material, especially expanded perlite, vermiculite, expanded clay, foam or cellular glass or hollow silicon carbide balls which define a body mounted upon a support as represented by the arrow 17 and engaging the surface 16 of the body. The surface 12 of the body engages the load 11 which is represented as applying a shock force in the direction of arrow 18. The body, according to the present invention, is precompressed in this direction by a distance 13 so that its original length $S$ has been reduced to its present length $s$. The percent deformation D equals $(S-s)/S \times 100$. D ranges between 5 and 35 percent and preferably is between 10 and 20 percent.

SPECIFIC EXAMPLES

Example I

A cylindrical test body of aluminum in which a vermiculite filler is encapsulated, is made by casting the aluminum into a mold containing vermiculite particles with a particle size of 4 to 5 mm in an amount of 50 volume-percent and a particle size of 2 to 4 mm in an amount of 50 volume-percent, the vermiculite particles being randomly filled into a mold. The cylindrical shock absorber has a specific gravity of 1.3 g/cm³. The energy absorber is loaded with a weight and drop-tested with the results shown in FIGS. 1a and 1b for a nonpredeformed specimen and a specimen deformed at a deformation D of 20 percent. The curves are those obtained with a polaroid camera from an oscilloscope connected to a linear differential transformer whose armature is displaced with the surface 12 and relative to the surface 16. The curves represent the retardation plotted against time, the retardation being in units of velocity of the surface 12 relative to the surface 16. Without predeformation, the velocity increases gradually over a relatively long period of time to a maximum and then falls off relatively gradually to the limit of the plastic deformation of the body at $t_{max}$. (FIG. 1a). While $t'_{max}$ is shorter in the predeformed sample (FIG. 1b), it can be seen that the retardation velocity rises to a plateau rapidly and remains substantially constant and thereupon falls off to zero at $t_{max}$ substantially more rapidly with the predeformation step. In this Example, the predeformation is effected in a press. The predeformed body thus has a substantially trapezoidal characteristic (FIG. 1b). In tests with samples deformed to $D=15$ percent or less, the curve of FIG. 1a is approached.

Example II

Figure 2A:
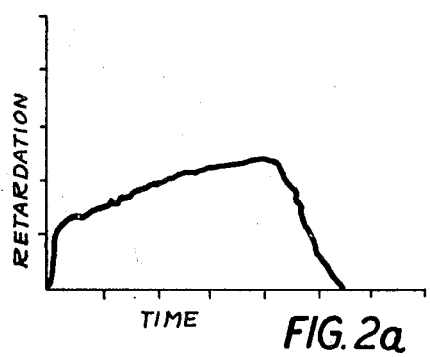
Figure 2B:
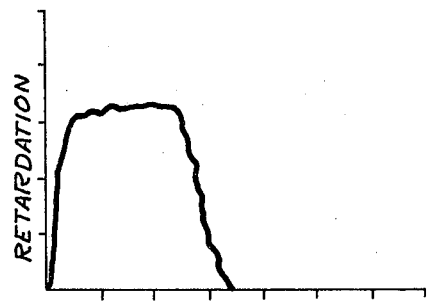

As in Example I, aluminum alloyed with 3 percent by weight magnesium is cast onto piled expanded perlite having a particle size of about 2 mm, to yield an energy absorber having a specific gravity of 1.24 g/cm³. This body is tested as in Example I. FIG. 2a shows the retardation versus time for the non-predeformed body, while FIG. 2b represents a plastic predeformation of $D=27$ percent. It is apparent that the predeformation yields a closer approach to a true trapezoid.

Example III

The energy absorber is prepared in Example I from an aluminum alloy containing 10 percent by weight magnesium and 5 percent by weight titanium hydride, which decomposes in the melt to provide a porous structure such that the specific gravity of the foamed metal is approximately 0.22 g/cm³. The body is tested as in Example I. The nonpredeformed body has a substantially linear and gradual rise of the retardation characteristic while a 10 percent predeformation provides results similar to those shown in FIG. 1a and slightly higher deformations yield the curve of FIG. 1b.

The bodies of Examples 1 – 3 were used effectively as shock absorber, barriers between bumpers of automotive vehicles and their chassis, as cushions between the suspension and the chassis and as overload cushions in jacks, cranes and similarly loaded structures.

I claim:

1. A method of making an energy-absorbing element, comprising the steps of forming a three-dimensional cellular metal body having a metal matrix and fully enclosed pores distributed three-dimensionally therein; and plastically predeforming said body over only a portion of its maximum plastic deformability prior to use of said body as an energy absorbing element.

2. The method defined in claim 1 wherein said body is plastically predeformed with a percentile deformation in one linear direction of substantially 5 to 35 percent.

3. The method defined in claim 2 wherein said deformation is between 10 and 20 percent.

4. The method defined in claim 3 wherein said body is deformed by compression.

5. The method defined in claim 3 wherein said body is deformed by elongation.

6. The method defined in claim 3 wherein said body is formed by smelting a metal hydride and releasing hydrogen gas therefrom.

7. The method defined in claim 3 wherein said body includes a cellular mineral filler.

8. The method defined in claim 7 wherein said mineral filler is vermiculite, expanded perlite, expanded clay, cellular glass or hollow corundum balls, said body being formed by casting a metal into the interstices of a pile of said filler.

9. The method defined in claim 1 wherein said metal is selected from the group which consists of aluminum, zinc, magnesium, nickel, copper and alloys thereof.

10. An energy-absorbing body having substantially a trapezoidal retardation characteristic versus time and consisting of a three-dimensional cellular metal structure of a metal matrix having pores distributed three-dimensionally therein and plastically predeformed in at least one linear dimension with a deformation degree of substantially 5 to 35 percent.

11. The body defined in claim 10 wherein said deformation degree is 10 to 20 percent.

12. The body defined in claim 11, consisting of a porous metal selected from the group which consists of aluminum, zinc, magnesium, nickel, copper or an alloy thereof.

13. The body defined in claim 12, further comprising mineral particles distributed in said metal and consisting of at least one mineral selected from the group which consists of vermiculite, perlite, expanded clay, cellular glass and hollow corundum balls.

14. A shock-absorbing assembly, comprising an energy-carrying element, a body as defined in claim 11, in force-receiving relationship with said energy-carrying element and a support element engageable with said body for resisting displacement thereof.

* * * * *